US009617919B2

(12) United States Patent
Williams et al.

(10) Patent No.: US 9,617,919 B2
(45) Date of Patent: Apr. 11, 2017

(54) IMPULSE DUTY CYCLE VALVES

(71) Applicant: Delavan Inc., Des Moines, IA (US)

(72) Inventors: Brandon P. Williams, Urbandale, IA (US); Neal A. Thomson, West Des Moines, IA (US)

(73) Assignee: Delavan Inc., West Des Moines, IA (US)

( * ) Notice: Subject to any disclaimer, the term of this patent is extended or adjusted under 35 U.S.C. 154(b) by 0 days.

(21) Appl. No.: 14/974,626

(22) Filed: Dec. 18, 2015

(65) Prior Publication Data

US 2016/0102614 A1    Apr. 14, 2016

Related U.S. Application Data

(62) Division of application No. 13/572,049, filed on Aug. 10, 2012, now Pat. No. 9,217,511.

(51) Int. Cl.
*F16K 31/06* (2006.01)
*F02C 7/232* (2006.01)
(Continued)

(52) U.S. Cl.
CPC .............. *F02C 7/232* (2013.01); *F16K 11/04* (2013.01); *F16K 31/0606* (2013.01); *F16K 31/0613* (2013.01); *F16K 31/0651* (2013.01); *F16K 31/0655* (2013.01); *F16K 31/0658* (2013.01); *F16K 31/10* (2013.01); *F16K 31/105* (2013.01); *H01F 7/121* (2013.01); *H01F 7/124* (2013.01); *H01F 2007/086* (2013.01)

(58) Field of Classification Search
CPC ...... F02C 7/232; F16K 11/04; F16K 31/0606; F16K 31/0658; F16K 31/0655; F16K 31/0651; F16K 31/0613; F16K 31/10; F16K 31/105; H01F 7/121; H01F 7/124; H01F 2007/086
USPC ............ 137/625.12, 625.15, 625.16, 625.17, 137/625.64; 251/129.15, 129.2, 129, 21, 251/22
See application file for complete search history.

(56) References Cited

U.S. PATENT DOCUMENTS 2,547,254 A * 4/1951 Braithwaite ............ F15B 13/06
137/625.17
3,173,646 A   3/1965 Wilcox
(Continued)

FOREIGN PATENT DOCUMENTS

DE      3905969 A1    8/1990
DE      3909551 A1   10/1990
(Continued)

OTHER PUBLICATIONS

European Search Report dated Oct. 28, 2013 issued on corresponding European Patent Application No. EP 13179473.7.

*Primary Examiner* — Mary McManmon
*Assistant Examiner* — Ian Paquette
(74) *Attorney, Agent, or Firm* — Locke Lord LLP; Joshua L. Jones; Daniel J. Fiorello

(57) ABSTRACT

A valve includes a valve housing having a fluid inlet and a fluid outlet with a longitudinal axis defined through the valve housing. The valve also includes a toggle mechanism configured and adapted to cycle flow from the fluid inlet to the fluid outlet through a plurality of different flow rates in response to repeated impulses. The toggle mechanism is also configured to hold flow rate steady between impulses.

9 Claims, 10 Drawing Sheets

(51) Int. Cl.
*F16K 11/04* (2006.01)
*H01F 7/08* (2006.01)
*H01F 7/121* (2006.01)
*H01F 7/124* (2006.01)
*F16K 31/10* (2006.01)

(56) References Cited

U.S. PATENT DOCUMENTS

| | | | |
|---|---|---|---|
| 3,220,695 | A | 11/1965 | Downey et al. |
| 3,678,954 | A | 7/1972 | Ostwald et al. |
| 3,780,980 | A | 12/1973 | Kallel |
| 4,383,477 | A | 5/1983 | Nilsson et al. |
| 4,880,403 | A | 11/1989 | Friedle et al. |
| 5,599,003 | A | 2/1997 | Seemann et al. |
| 5,727,591 | A | 3/1998 | Doll |
| 5,794,860 | A | 8/1998 | Neumann |
| 6,199,823 | B1 | 3/2001 | Dahlgren et al. |
| 8,186,647 | B2 | 5/2012 | Chen et al. |
| 8,272,402 | B2 * | 9/2012 | Reilly ............... F16K 3/26 137/625.65 |
| 2003/0042452 | A1 | 3/2003 | Burke |
| 2006/0022161 | A1 | 2/2006 | Yamashita |
| 2006/0231785 | A1 | 10/2006 | Hans et al. |

FOREIGN PATENT DOCUMENTS

| | | | |
|---|---|---|---|
| EP | 0685672 | A1 | 12/1995 |
| FR | 1480666 | A | 5/1967 |
| JP | S5129555 | Y1 | 7/1976 |
| JP | S584862 | U | 1/1983 |

\* cited by examiner

IMPULSE DUTY CYCLE VALVES

CROSS-REFERENCE TO RELATED APPLICATION

The subject application is a divisional of U.S. patent application Ser. No. 13/572,049, filed on Aug. 10, 2012, which is incorporated herein by reference in its entirety.

BACKGROUND OF THE INVENTION

1. Field of the Invention

The present invention relates to valves, and more particularly to valves with near zero duty cycle for use in applications such as fuel injection in gas turbine engines.

2. Description of Related Art

A variety of devices are known for metering or checking flow through a system using valves. Traditional valves can be actuated using electrical means, such as linear solenoids, hydraulic means, mechanical means, piezoelectric means, or the like.

Some systems may require multiple valves that can be individually actuated. For example, in gas turbine engines, it is desirable to have individual control for flow to each fuel injector. Since there are typically several fuel injectors in each engine, e.g., twenty or so individual injectors depending on the type of engine, individual injector control requires several individual valves, e.g., about twenty or so. Using traditional valves, difficulties have made impractical the ideal of an individual valve for each injector. The most straightforward actuation means for valves in gas turbine engines are electrical means, such as solenoids. However, given the number of solenoids required, the power requirements using traditional valves are prohibitive. For a system with twenty traditional solenoid valves, in order to maintain all twenty valves in the open position requires a continuous supply of power to each of the twenty solenoids. The power required to hold the twenty solenoids in the open position is actually a considerable amount of the total power generated by the engine itself. Other means of actuation, such as mechanical or hydraulic, introduce complications of their own. For at least the foregoing, it has heretofore been difficult to implement individual injector control in applications like gas turbine engines.

Such conventional methods and systems have generally been considered satisfactory for their intended purpose. However, there is still a need in the art for valves that allow for improved duty cycles. There also remains a need in the art for such valves that are easy to make and use. The present invention provides a solution for these problems.

SUMMARY OF THE INVENTION

The subject invention is directed to a new and useful valve. The valve includes a valve housing having a fluid inlet and a fluid outlet with a longitudinal axis defined through the valve housing. The valve also includes a toggle mechanism configured and adapted to cycle flow from the fluid inlet to the fluid outlet through a plurality of different flow rates in response to repeated impulses. The toggle mechanism is also configured to hold flow rate steady between impulses.

In certain embodiments, the toggle mechanism can cycle flow between a valve closed, zero flow rate and a valve opened, full flow rate, and back. The cycle of flow can also include a partially opened, staged flow rate. The toggle mechanism can include a solenoid operatively mounted to the valve housing surrounding an armature mounted within the solenoid for movement relative to the valve housing, wherein the solenoid is configured and adapted to provide impulse actuation to the armature for cycling the flow rates.

In accordance with certain embodiments, an armature is mounted within the valve housing for movement relative to the valve housing along the longitudinal axis. A pintle is mounted within the armature for rotational movement about the longitudinal axis relative to the valve housing and for linear movement relative to the valve housing along the longitudinal axis. The pintle and armature are configured and adapted so that repeated impulse actuation of the armature along the longitudinal axis toggles the pintle between a first linear position in which the pintle blocks flow from the fluid inlet to the fluid outlet, and a second linear position in which the pintle allows flow from the fluid inlet to the fluid outlet.

It is contemplated that each of the valve housing, armature, and pintle can include interlocking toggle features configured and adapted to rotate the pintle about the longitudinal axis when toggling between the first and second linear positions. The toggle features of the valve housing can include a plurality of deep pockets alternating circumferentially with shallow pockets. The toggle features of the pintle can include a plurality of fingers, wherein in the first linear position of the pintle, the fingers of the pintle engage the deep pockets of the valve housing, and wherein in the second linear position of the pintle, the fingers of the pintle engage the shallow pockets of the valve housing.

The toggle features of the armature can include a plurality of guides, with one guide disposed in each pocket of the valve housing for guiding linear movement of the armature. The toggle features of the armature can include a plurality of cam faces configured and adapted to engage the fingers of the pintle to rotate the pintle about the longitudinal axis when toggling between the first and second linear positions.

In certain embodiments, a pintle spring can be mounted in the valve housing to bias the pintle fingers into the pockets of the valve housing. An armature spring is mounted in the valve housing to bias the armature away from the pintle fingers. A solenoid is operatively mounted to the valve housing surrounding the armature. The solenoid is configured and adapted to provide impulse actuation to the armature for toggling the linear position of the pintle. The pintle spring and armature spring are biased against actuation forces of the solenoid for maintaining position of the pintle and armature between solenoid impulses.

It is also contemplated that in certain embodiments the pintle is mounted within the valve housing with an interior flow passage defined in the pintle in fluid communication with the fluid inlet of the valve housing. The pintle includes a pintle outlet for selective fluid communication between the interior flow passage of the pintle and the fluid outlet of the valve housing. The pintle and armature are configured and adapted so that repeated impulse actuation of the armature along the longitudinal axis cycles the pintle between first and second rotational positions corresponding to first and second flow rates for fluid communication from the interior flow passage of the pintle to the fluid outlet of the valve housing.

For example, in the first rotational position, fluid communication from the interior flow passage of the pintle to the fluid outlet of the valve housing can be blocked for a zero flow rate. And in the second rotational position, the interior flow passage of the pintle can be in fluid communication with the fluid outlet of the valve housing.

First and second flow circuits can be defined in the fluid outlet of the valve housing for staging of flow between the first and second flow circuits. In the first rotational position of the pintle, the interior flow passage of the pintle can be in fluid communication with the first flow circuit, and in the second rotational position of the pintle, the interior flow passage of the pintle can be in fluid communication with the second flow circuit. It is also contemplated that the second rotational position of the pintle, the interior flow passage of the pintle can be in fluid communication with both of the first and second flow circuits. A portion of the first and second flow circuits can be defined in the armature. The armature and pintle can fit together with a liquid tight clearance for separation of the first and second flow circuits.

These and other features of the systems and methods of the subject invention will become more readily apparent to those skilled in the art from the following detailed description of the preferred embodiments taken in conjunction with the drawings.

BRIEF DESCRIPTION OF THE DRAWINGS

So that those skilled in the art to which the subject invention appertains will readily understand how to make and use the devices and methods of the subject invention without undue experimentation, preferred embodiments thereof will be described in detail herein below with reference to certain figures, wherein.

DETAILED DESCRIPTION OF THE PREFERRED EMBODIMENTS

Figure 1:
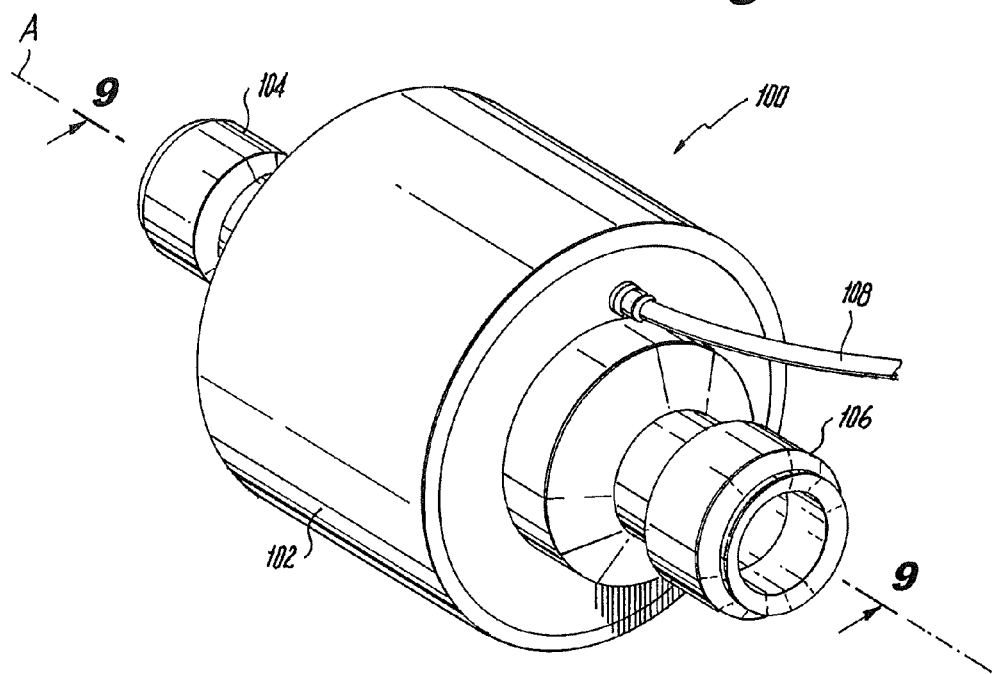
FIG. 1 is a perspective view of an exemplary embodiment of a valve constructed in accordance with the present invention, showing the fluid inlet and outlet and a portion of an actuator control line viewed generally towards the fluid outlet.

Reference will now be made to the drawings wherein like reference numerals identify similar structural features or aspects of the subject invention. For purposes of explanation and illustration, and not limitation, a partial view of an exemplary embodiment of a valve in accordance with the invention is shown in FIG. 1 and is designated generally by reference character 100. Other embodiments of valves in accordance with the invention, or aspects thereof, are provided in FIGS. 2-19, as will be described. The systems and methods of the invention can be used to control fluid flow through a line, such as for controlling fuel flow in a fuel line for a gas turbine engine, with a low, impulse based duty cycle, i.e., a near zero duty cycle.

Figure 2:
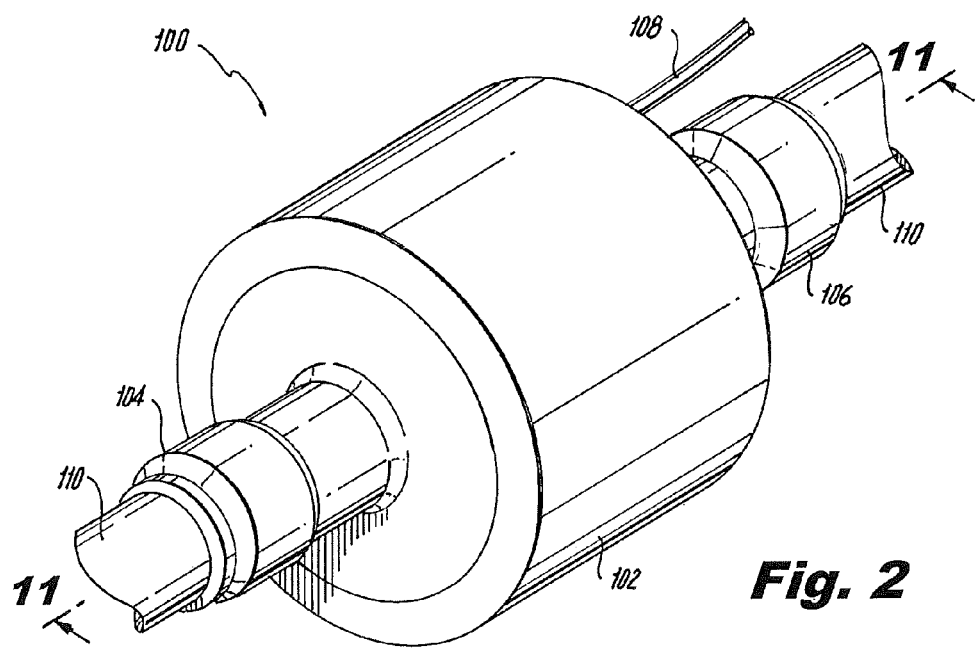
FIG. 2 is a perspective view of the valve of FIG. 1, showing the fluid inlet and outlet connected to inlet and outlet lines, viewed generally toward the fluid inlet.

Valve 100 generally includes a valve housing 102 having a fluid inlet 104 and a fluid outlet 106 with a longitudinal axis A defined through valve housing 102. An electrical control line 108 communicates through valve housing 102 to provide impulses of power to toggle the flow through valve 100. As shown in FIG. 2, inlet 104 and outlet 106 of valve 100 are configured to be connected in a line 110, such as a fuel line, to control flow through the line. For example, valve 100 can be used to control flow to an individual fuel injector or group of injectors in a gas turbine engine.

Figure 3:
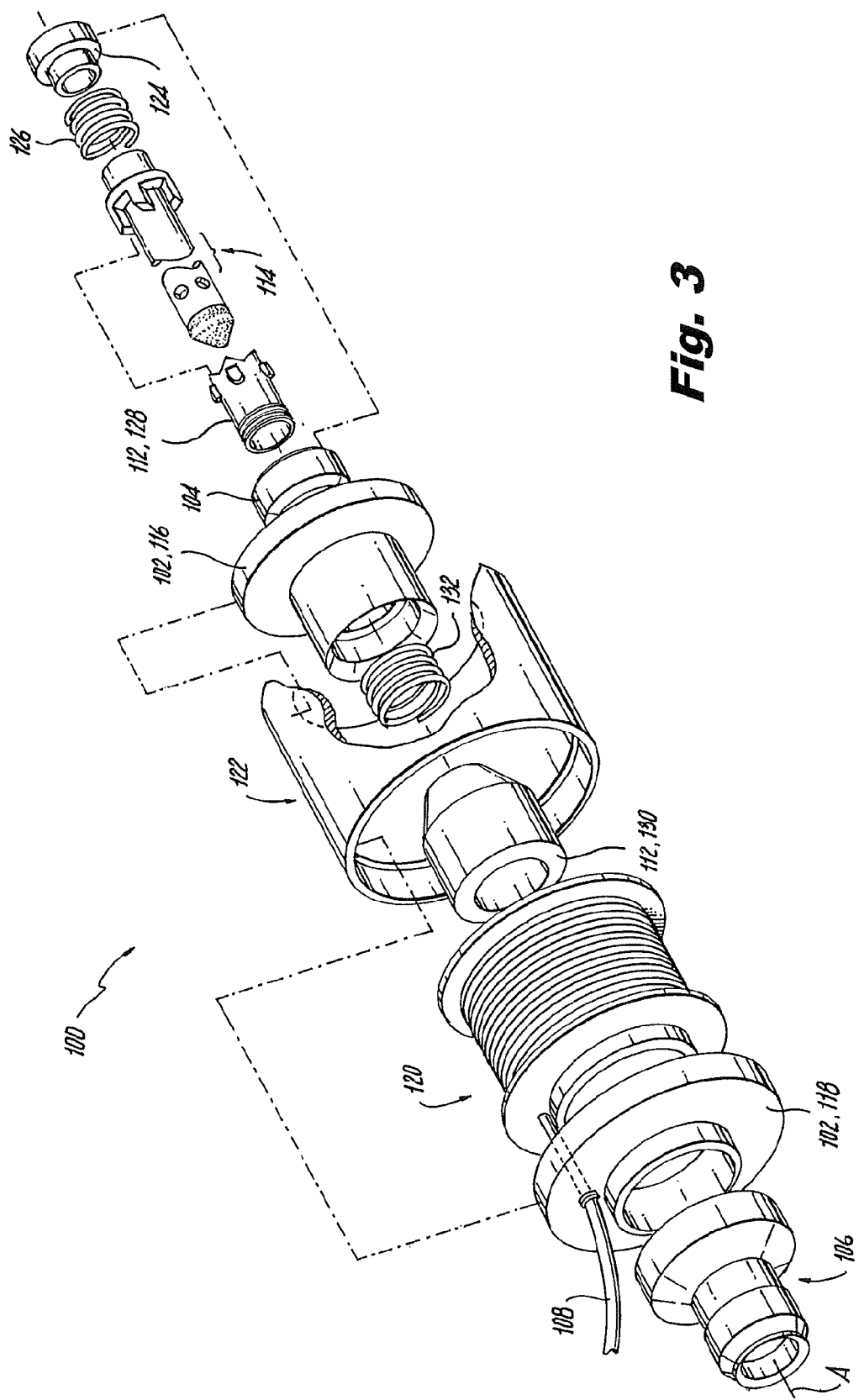
FIG. 3 is an exploded perspective view of the valve of FIG. 1, showing the valve housing, pintle and armature components.
Figure 4:
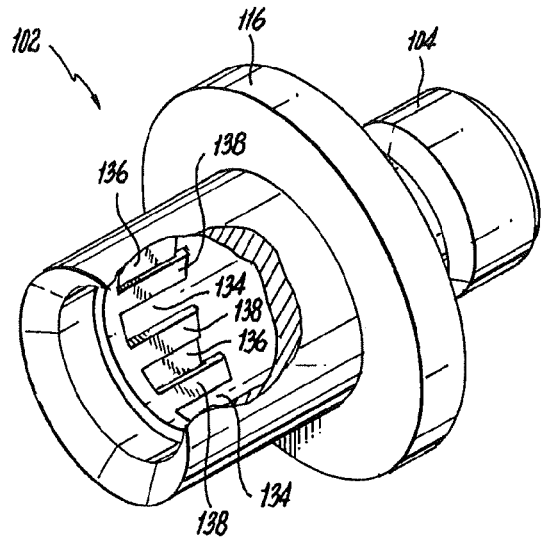
FIG. 4 is partially cut away perspective view of the inlet portion of the valve housing of the valve of FIG. 3, showing the alternating fingers and pockets of the toggle features defined in the interior of the inlet portion of the valve housing.

With reference now to FIG. 3, valve 100 includes internal components defining a toggle mechanism that can cycle flow from fluid inlet 104 to the fluid outlet 106 through a plurality of different flow rates. Since the toggle mechanism only requires repeated impulses to cycle the flow rates, the toggle mechanism can hold flow rate steady without requiring any power input between impulses. Armature 112 is mounted within valve housing 102 for movement relative to valve housing 102 along longitudinal axis A. A pintle 114 is mounted within armature 112 for rotational movement about longitudinal axis A relative to valve housing 102 and for linear movement relative to valve housing 102 along longitudinal axis A. Pintle 114 and armature 112 are configured and adapted so that repeated impulse actuation of armature 112 along longitudinal axis A toggles pintle 114 between a first linear position in which pintle 114 blocks flow from fluid inlet 104 to fluid outlet 106, and a second linear position in which pintle 114 allows flow from fluid inlet 104 to fluid outlet 106.

Figure 9:
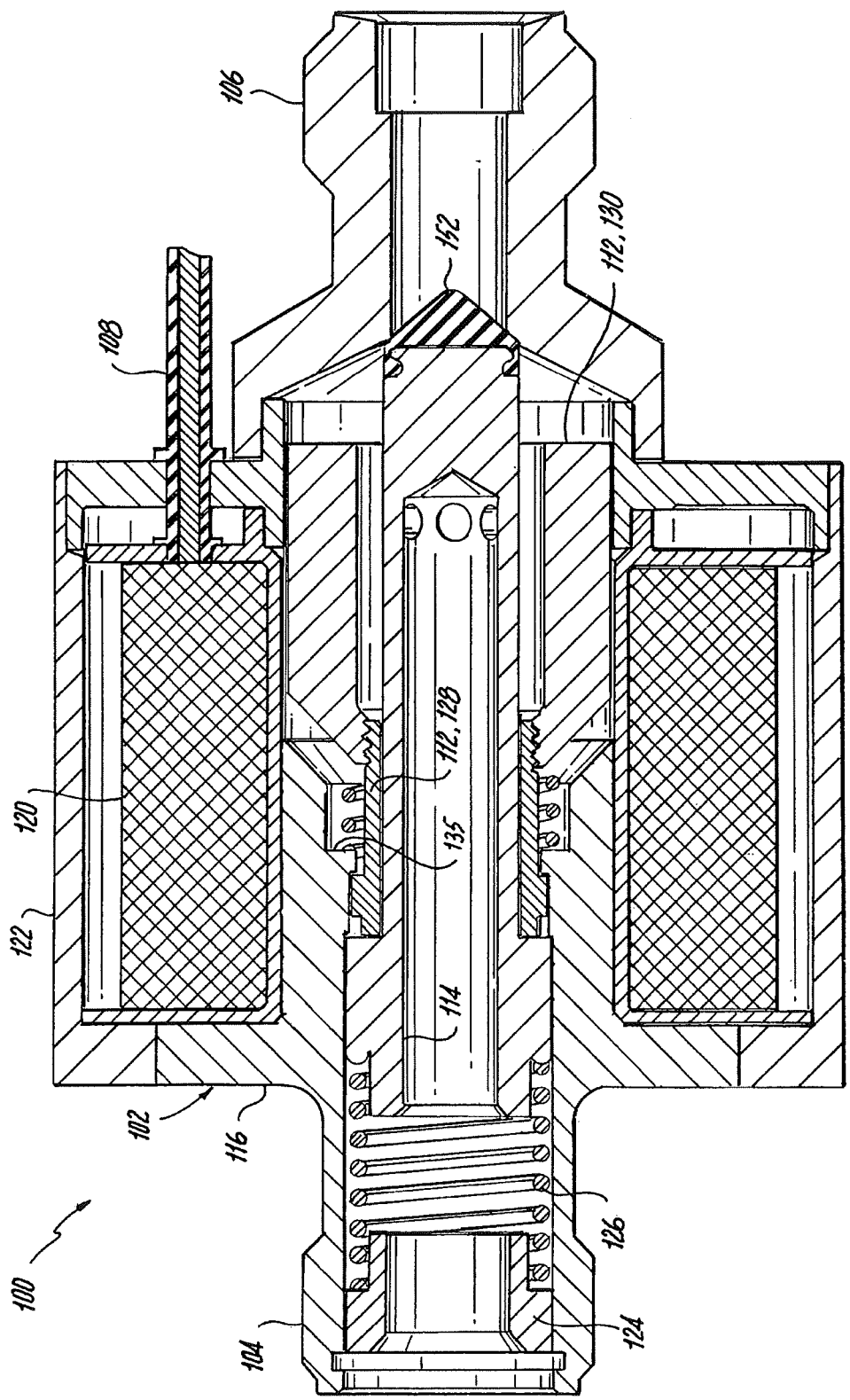
FIG. 9 is a cross-sectional side elevation view of the valve of FIG. 1, showing the solenoid actuator for providing impulse power to toggle the toggle mechanism, with the pintle in a first linear position blocking flow through the valve.

With continued reference to FIG. 3, valve housing 102 includes an inlet fitting 116 and an outlet flange 118 with a solenoid 120 mounted therebetween, electrically connected to control line 108. Solenoid 120 surrounds armature 112. Valve housing 102 also includes an outer casing 122 enclosing solenoid 120. Fluid outlet 106 is mounted to outlet flange 118. Spring base 124 is mounted in the mouth of inlet fitting 116. Pintle spring 126 is compressed between pintle 114 and spring base 124 to bias pintle 114 towards fluid outlet 106. Armature 112 includes an armature guide 128 and an armature mass 130, which are threaded together and are slidingly mounted in place around pintle 114. Armature spring 132 is compressed between a ledge 135 defined inside inlet fitting 116 and armature mass 130 to bias armature 112 towards fluid outlet 106, as shown in FIG. 9.

Figure 5:
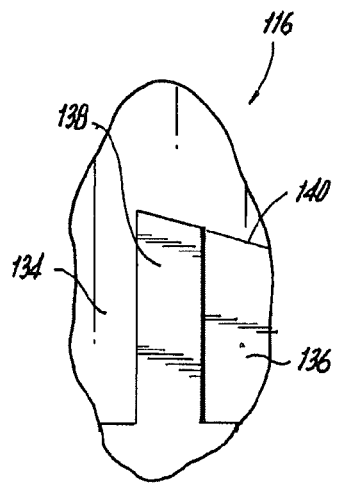
FIG. 5 is a radial view of a portion of the toggle mechanism defined in the inlet portion of the valve housing of FIG. 4, showing one of the fingers between two of the pockets.

Referring now to FIGS. 4-8, each of valve housing 102, armature 112, and pintle 114 includes interlocking toggle features configured and adapted to rotate pintle 114 about longitudinal axis A when toggling between the first and second linear positions. A portion of inlet fitting 116 of valve housing 102 is shown cut away in FIG. 4 to reveal the toggle features defined on the inner surface of inlet fitting 116. The toggle features of valve housing 102 include a plurality of deep pockets 134 alternating circumferentially with shallow pockets 136. Each of the pockets 134, 136 is separated from the adjacent pockets by a finger 138. FIG. 5 shows one of the fingers 138 with a deep pocket 134 on the left and a shallow pocket 136 on the right. Shallow pockets 136 are shallow in the direction into and out of the view in FIG. 5, which leaves a ledge 140 that extends into the interior of inlet fitting 116 enough to prevent pintle fingers 142, shown in FIG. 7, moving past ledge 140 toward the bottom of pocket 136 as oriented in FIG. 5. Shallow pockets 136 are therefore also shallow in the vertical direction, as oriented in FIG. 5 as far as concerns the movement of pintle fingers 142.

Figure 6:
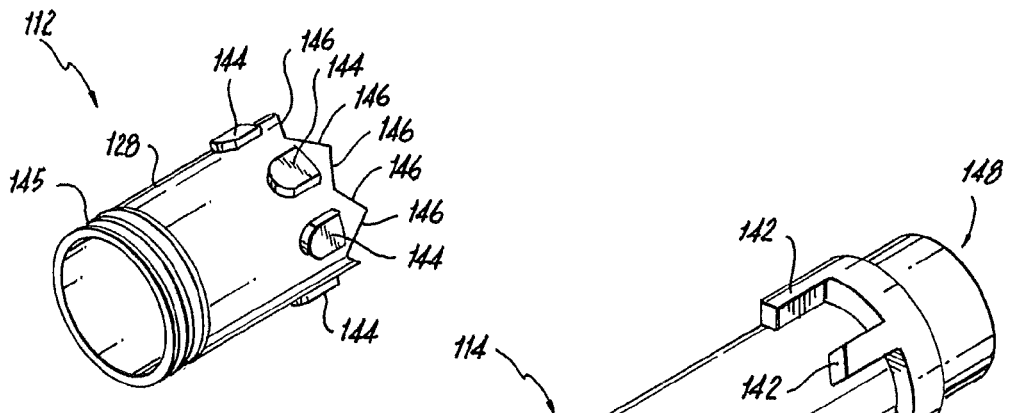
FIG. 6 is a perspective view of the guide portion of the armature in the valve of FIG. 3, showing the guides and cam faces of the armature.

The toggle features of armature 112 are shown in FIG. 6 and include a plurality of guides 144, with one guide 144 disposed in each pocket 134, 136 of valve housing 102 for guiding linear movement of armature 112. The toggle features of the armature also include a plurality of cam faces 146 configured and adapted to engage fingers 142 of pintle 114 to rotate pintle 114 about longitudinal axis A when toggling between the first and second linear positions. Armature guide 128 includes threads 145 for attachment to armature mass 130.

Figure 7:
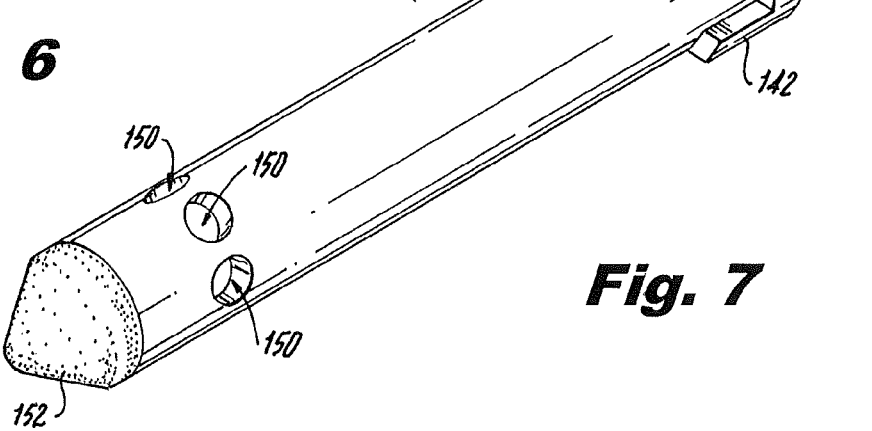
FIG. 7 is a perspective view of the pintle of the valve of FIG. 3, showing the flow ports through the pintle, as well as the fingers of the toggle mechanism defined on the pintle.
Figure 8:
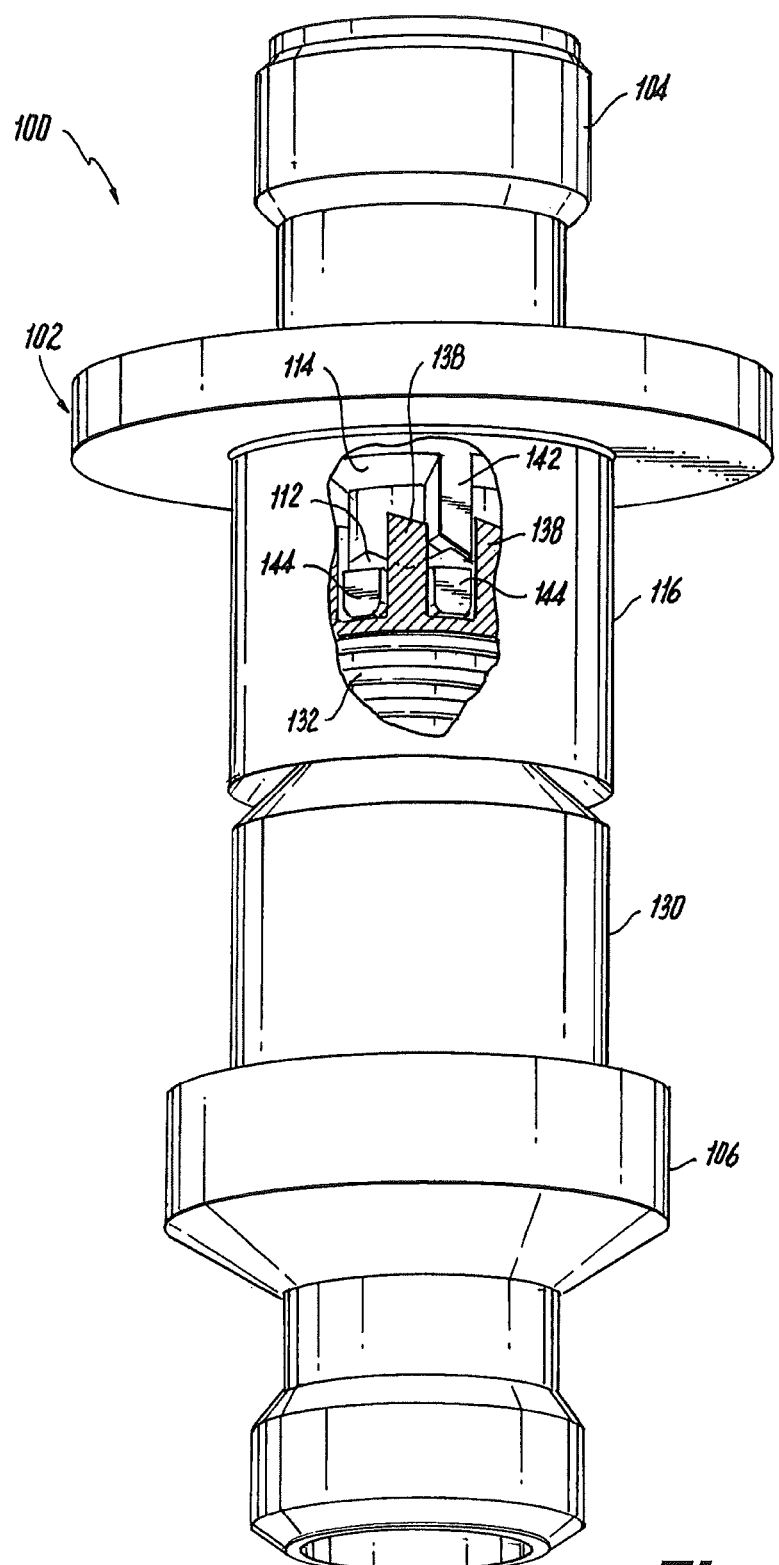
FIG. 8 is a partially cut away perspective view of a portion of the valve of FIG. 1, showing the toggle mechanism assembled in the interior of the valve.

The toggle features of pintle 114 are shown in FIG. 7 and include a plurality of fingers 142, which as indicated above engage with pockets 134, 136 of valve housing 102. Pintle 114 has an interior flow passage with an inlet 148, and a plurality of radial outlet ports 150. The end of pintle 114 opposite inlet 148 defines a plug 152, e.g., of an elastomeric or other suitable seal material, for blocking flow into outlet 106 of valve 100 when pintle 114 is in the first linear position. The toggle features of housing 102, armature 112, and pintle 114 are shown assembled together in FIG. 8 through the cut-away portion of inlet fitting 116 of valve housing 102.

Figure 10:
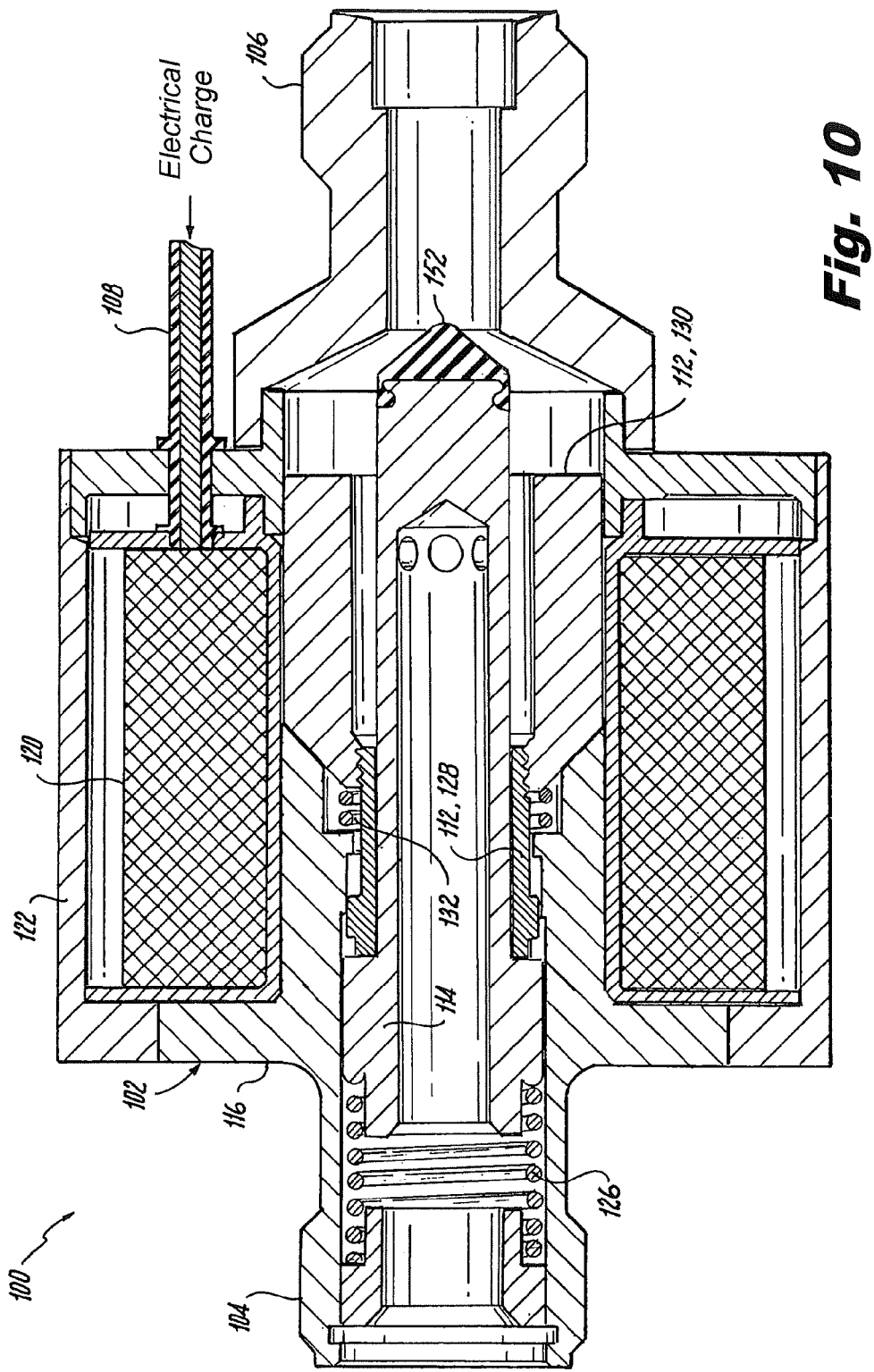
FIG. 10 is a cross-sectional side elevation view of the valve of FIG. 9, showing the pintle in a second linear position allowing flow through the valve.
Figure 11:
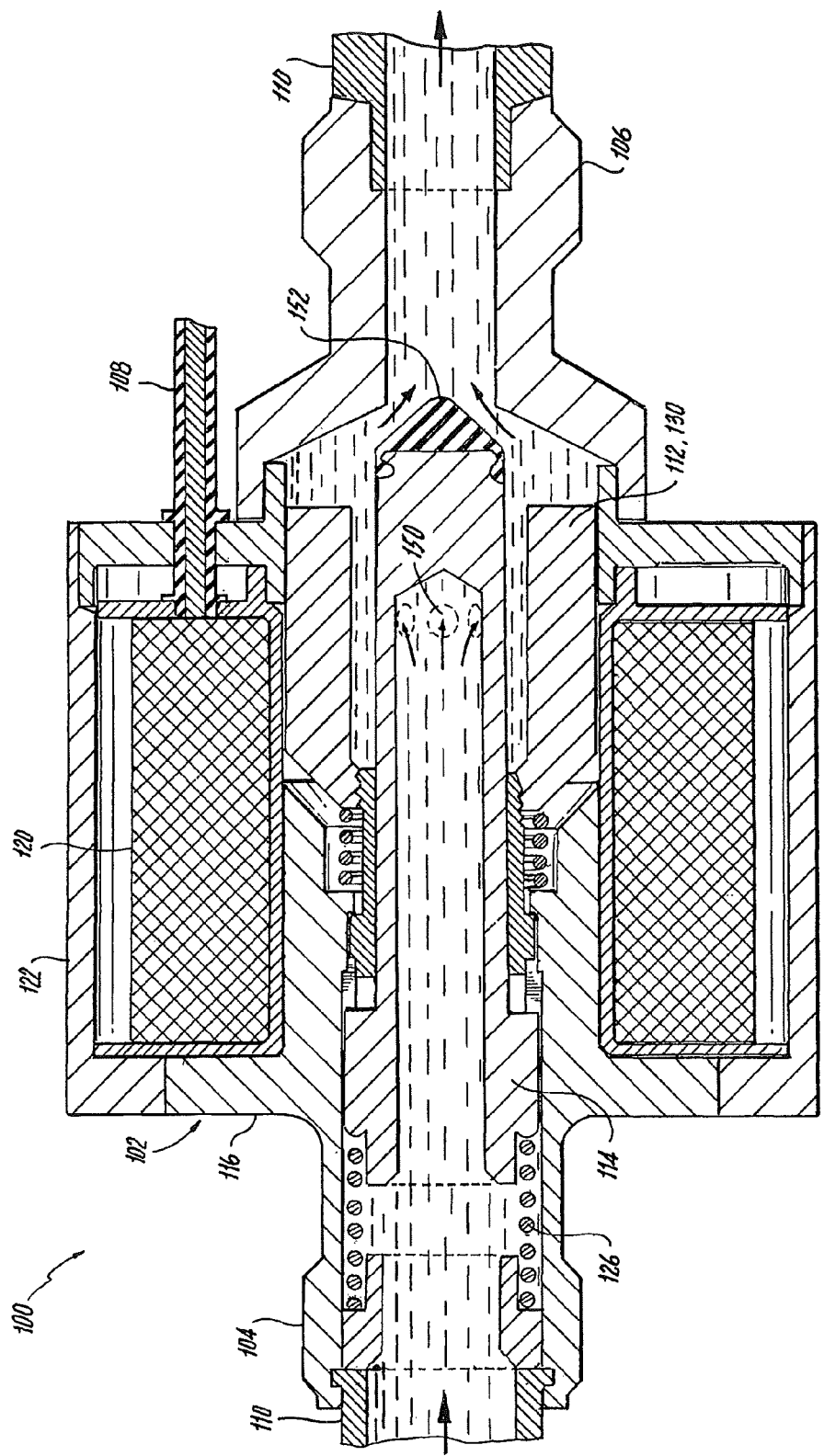
FIG. 11 is a cross-sectional side elevation view of the valve of FIG. 10, schematically showing flow of a liquid through the valve.

With reference now to FIGS. 9-11, a first cycle of toggling of the first and second linear positions of pintle 114 is shown and described with respect to the flow path through valve 100. As shown in FIG. 9, in the first linear position of pintle 114, plug 152 seals against the opening of fluid outlet 106, blocking flow through valve 100. This is the first linear position of pintle 114. Solenoid 120 forms a part of the toggle mechanism and is operatively mounted to valve housing 102 surrounding armature 112. A portion of armature mass 130 extends laterally beyond the right end of solenoid 120 as oriented in FIG. 9, so the mass of armature 112 is off center relative to solenoid 120. Solenoid 120 is configured and adapted to provide impulse actuation to armature 112 for toggling the linear position of pintle 114 to cycle the flow rates of valve 100, however the pintle position shown in FIG. 9 can be maintained indefinitely without any power applied to solenoid 120.

Referring now to FIG. 10, the position of armature 112 is shown at the moment of an impulse from control line 108, as indicated schematically by the electrical charge arrow. The magnetic field produced by the impulse of power applied to solenoid 120 creates a centering force on armature mass 130 which overcomes the biasing force of armature spring 132. This also moves pintle 114 against the biasing force of pintle spring 126. In FIG. 10, armature 112 and pintle 114 are shown moved to the left relative to the position shown in FIG. 9. When the impulse to solenoid 120 ends, pintle 114 rotates about longitudinal axis A, which toggles pintle 114, as will be described in greater detail below, to allow pintle 114 to come to rest in the second linear position.

Referring now to FIG. 11, due to the toggling of pintle 114 described above with reference to FIG. 10, pintle 114 remains in the position shown in FIG. 11 even though armature 112 returns to its original position after the solenoid impulse. This is the second linear position of pintle 114, in which plug 152 is spaced apart from the opening of fluid outlet 106. This second linear position of pintle 114 allows fluid to flow through valve 100, as indicated schematically in FIG. 11. The flow path through valve 100 includes fluid inlet 104, which receives fluid from an upstream line 110. From there, fluid flows through inlet 148 (identified in FIG. 7) of pintle 114 into the interior flow passage of pintle 114. Fluid flows out of the interior flow passage of pintle 114 through radial ports 150 (identified in FIG. 7). From radial ports 150, the fluid can pass between armature mass 130 and the outer surface of pintle 114 to the gap between plug 152 and the opening of fluid outlet 106 and on into downstream line 110. Since pintle spring 132 and armature spring 126 are biased against actuation forces of solenoid 120, they maintain the position of pintle 114 and armature 112 between solenoid impulses without requiring any power.

Figure 12:
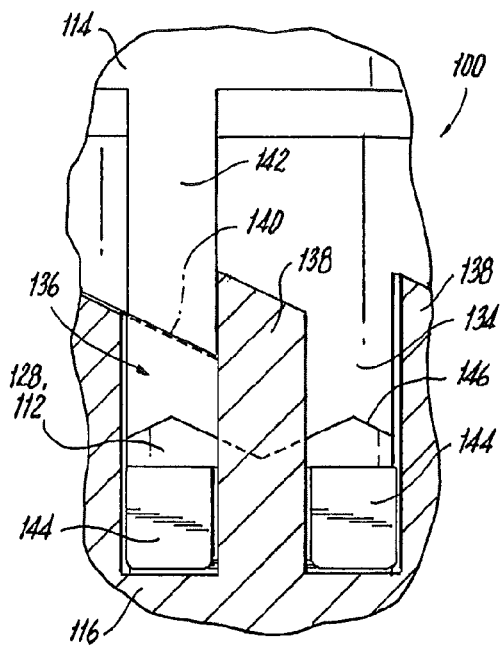
FIG. 12 is a schematic view of the toggle mechanism of FIG. 8, showing the finger of the pintle seated in a shallow pocket of the valve housing.
Figure 13:
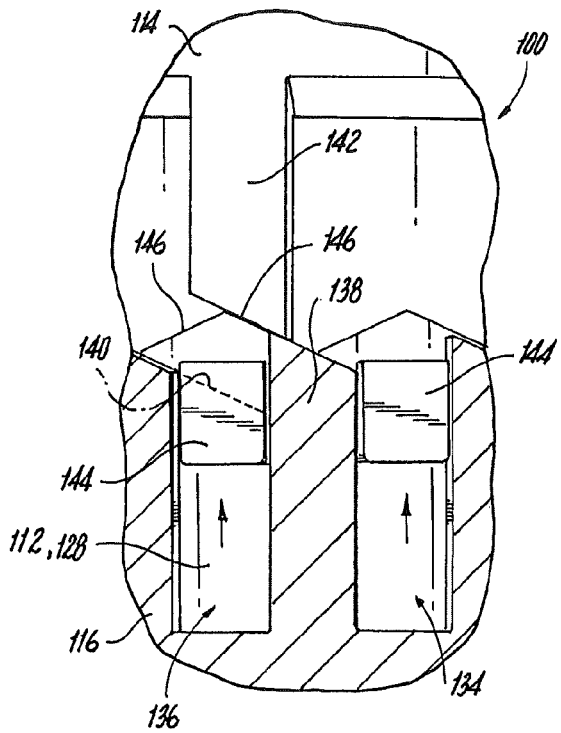
FIG. 13 is a schematic view of the toggle mechanism of FIG. 8, showing the camming surface of the armature forcing the finger of the pintle out of the shallow pocket of the valve housing, with the finger of the pintle beginning to slide off of the camming surface into one of the deep pockets of the valve housing.

The toggling from the first to the second linear positions of pintle 114 has been described above. With reference now to FIGS. 12-15, the cycling of the toggle mechanism from the second back to the first linear position of the pintle 114 is explained with particular reference to the toggle features of valve housing 102, armature 112, and pintle 114. Referring first to FIG. 12, pintle fingers 142, only one of which is shown, engage shallow pockets 136 of inlet fitting 116, urged against ledge 140 by pintle spring 126, which is shown in FIG. 3. This is the second linear position of pintle 114, which corresponds to the state shown in FIG. 11 wherein plug 152 is withdrawn from outlet 106 to allow flow through valve 100. No power is required to maintain the toggle mechanism in this state.

When it is desired to toggle valve 100, solenoid 120 received an impulse of electrical power by way of control line 108, shown in FIG. 3. This creates a magnetic field that pulls armature mass 130 towards the center of solenoid 120, overcoming the biasing force of armature spring 132 to advance armature guide 128 upward as oriented in FIG. 13. This movement is indicated by the upward arrows in FIG. 13, and causes cam faces 146 of pintle 114 to engage the lateral ends of pintle fingers 142. Pintle 114 is moved upward out of shallow pocket 136 as oriented in FIG. 13, overcoming the biasing force of pintle spring 126 until the lateral end of fingers 142 clear the lateral ends of fingers 138 and begin sliding into the next adjacent pockets 134.

Figure 14:
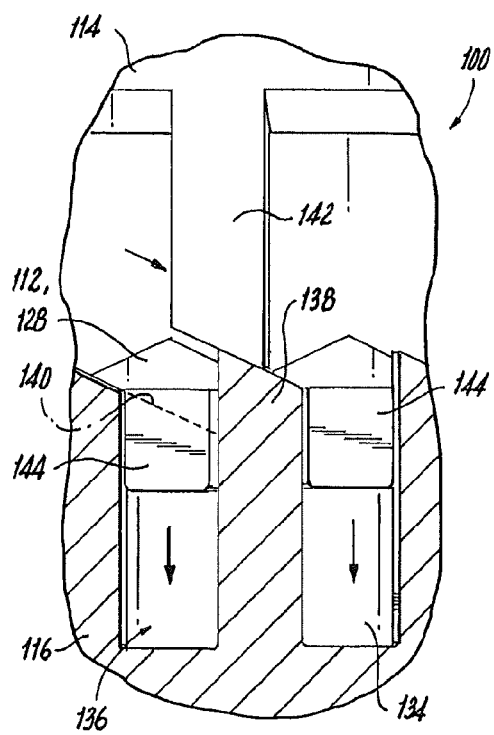
FIG. 14 is a schematic view of the toggle mechanism of FIG. 8, showing the withdrawal of the armature and the camming of the finger of the pintle along the camming surface of the finger of the valve housing.

After the impulse ends, pintle spring 132 returns pintle guide 128 downward as oriented in FIG. 14, biasing armature 112 away from pintle fingers 142 as indicated by the downward arrows in FIG. 14, to its original position with guides 144 bottomed out in pockets 134, 136. Pintle fingers 142 cam downward and to the right as oriented in FIG. 14 along the end faces of the respective fingers 138, which motion is indicated by the diagonal arrow in FIG. 14. The lateral motion of pintle fingers 142 is actually rotation about longitudinal axis A. When pintle 114 has rotated far enough to align pintle fingers 142 with deep pockets 134, pintle fingers move downward as oriented in FIG. 14 to rest against cam faces 146, engaging within deep pockets 134 under the biasing force of pintle spring 126.

Figure 15:
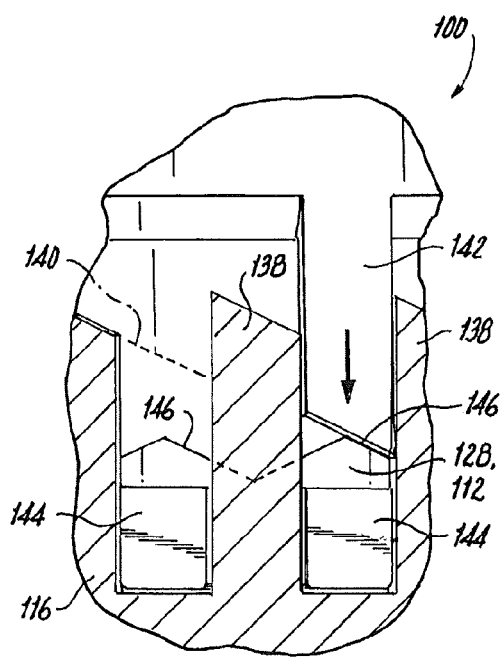
FIG. 15 is a schematic view of the toggle mechanism of FIG. 8, showing the finger of the pintle seated in a deep pocket of the valve housing.

Due to the extra depth of deep pockets 134 compared to shallow pockets 136, pintle 114 actually advances further downward in FIG. 15 than in FIG. 12. The effect of this at the other end of pintle 114 is that plug 152 seals the opening into outlet 106, blocking flow through valve 100 as shown in FIG. 9. This is the first linear position of the pintle. The toggle mechanism can also hold this valve closed position indefinitely without requiring any power until it is desired to toggle back to the second liner position to allow flow through valve 100.

One notable aspect of toggling from the first to the second linear positions of pintle 114 is that in addition to cycling between linear positions, pintle 114 is also rotated around longitudinal axis A as pintle fingers 142 transfer into successive pockets 134, 136 of inlet fitting 116. This rotational cycling can be incorporated into valving functions, as described below.

Figure 16:
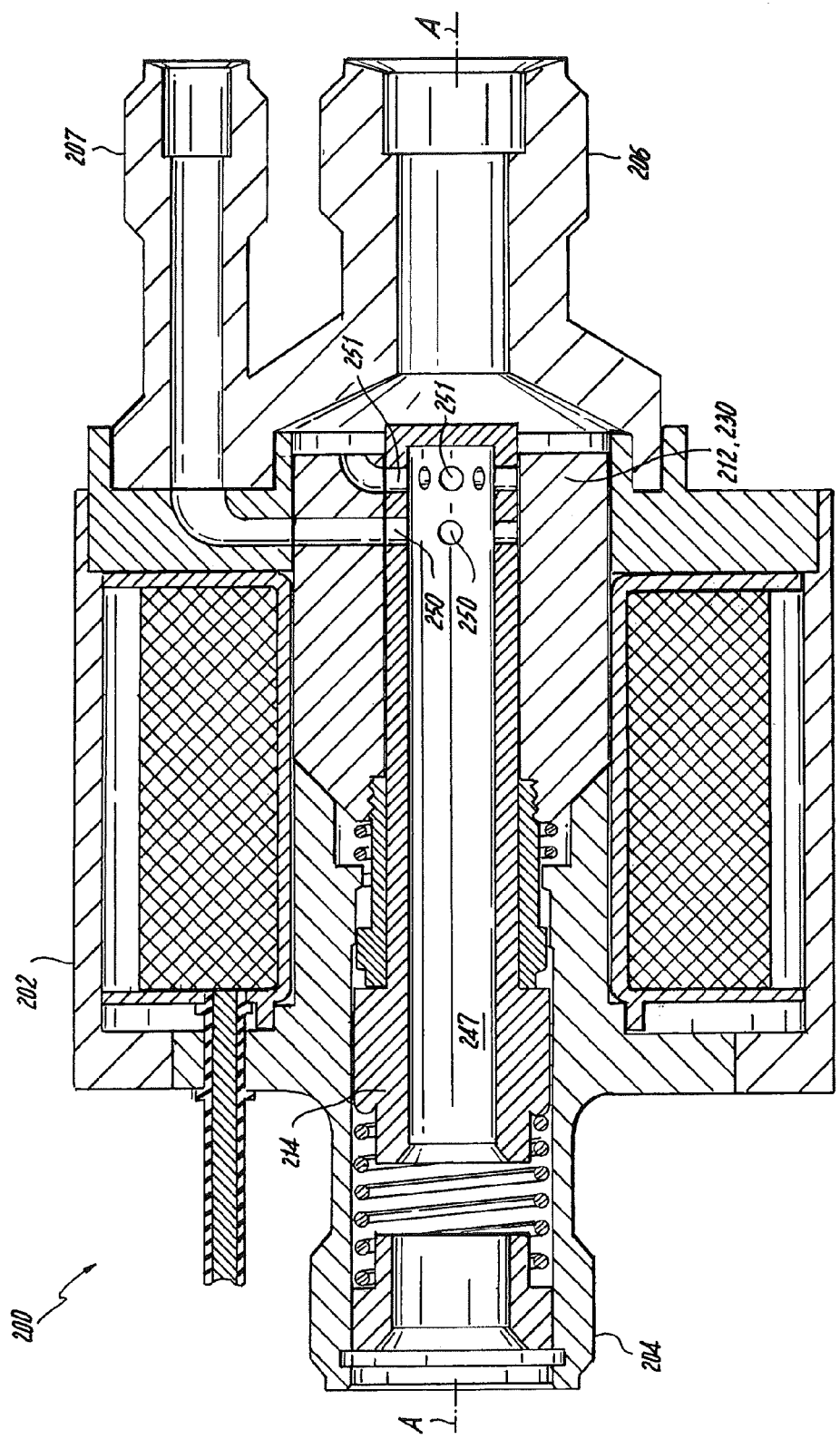
FIG. 16 is a is a cross-sectional side elevation view of another exemplary embodiment of a valve constructed in accordance with the present invention, showing the first and second flow circuits that can be staged by cycling the pintle through first and second rotational positions.

Referring now to FIG. 16, another exemplary embodiment of a valve 200 utilizes the cycling rotational positions of pintle 214 to cycle flow for multiple fluid circuits. Pintle 214 is mounted within the valve housing 202 with an interior flow passage 247 defined in pintle 214 in fluid communication with fluid inlet 204 of valve housing 202. Pintle 214 includes a plurality of pintle outlets 250 for selective fluid communication between interior flow passage 247 and first fluid outlet 207 of valve housing 202. Pintle 214 and armature 212 are configured and adapted so that repeated impulse actuation of armature 212 along the longitudinal axis A cycles pintle 214 between first and second rotational positions corresponding to first and second flow rates for fluid communication from interior flow passage 247 to fluid outlet 207 of valve housing 202.

Figure 18:
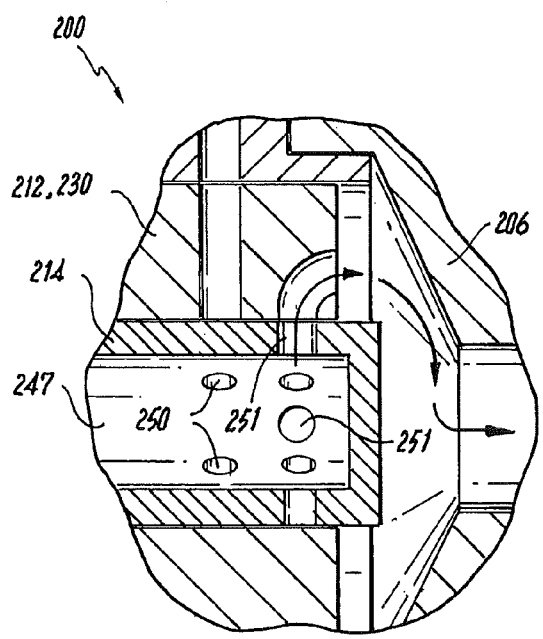
FIG. 18 is a cross-sectional elevation view of a portion of the valve of FIG. 16, showing the pintle in the first rotational position where flow is only allowed through one of the flow circuits.
Figure 19:
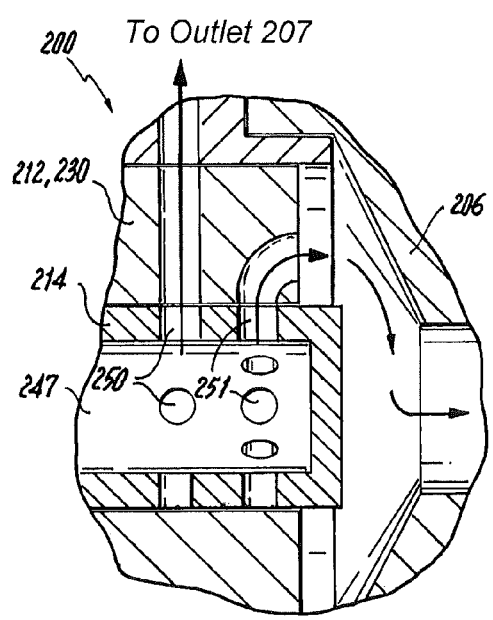
FIG. 19 is a cross-sectional elevation view of a portion of the valve of FIG. 16, showing the pintle in the second rotational position where flow is allowed through both flow circuits.

Referring go FIGS. 18 and 19, in the first rotational position, fluid communication from interior flow passage 247 of pintle 214 to fluid outlet 207 of valve housing 202 is blocked for a zero flow rate, as indicated in FIG. 18. In the second rotational position, interior flow passage 247 of pintle 214 is in fluid communication with fluid outlet 207, as indicated schematically by the arrow to outlet 207 in FIG. 19.

Referring again to FIG. 16, a second flow circuit is defined in fluid outlet 206 of valve housing 202, and flow between the first and second flow circuits can be staged. In the second rotational position of the pintle 214, shown in FIGS. 16 and 19, interior flow passage 247 of pintle 214 is in fluid communication with the first flow circuit via outlet 250 as well as a second flow circuit via outlets 251. A portion of the first flow circuit includes a passage through armature mass 230 that leads to fluid outlet 207. A portion of the second flow circuit includes a passage through armature mass 230 that leads to fluid outlet 206. Liquid tight communication between outlets 250, 251 and the passages in armature mass 230 can be accomplished by match grinding wherein the clearance between pintle 214 and armature mass 230 is sufficient to allow a lubricious film of fluid in the clearance, but tight enough to prevent any significant flow in the clearance, separating of the first and second flow circuits.

The pattern of outlet ports 250 and 251 determines the cycles of the flow circuits. In the example shown in FIGS. 16 and 18-19, there is one outlet 251 defined through pintle 214 for every rotational position, thus the second flow circuit is allowed to flow in every rotational position. In the same example, there is only an outlet 250 defined through pintle 214 for every other rotational position, therefore in every other rotational position flow is blocked for the first flow circuit. It is also contemplated that if desired for a given application, in each cycle a portion of pintle 214 devoid of outlets can be included for one rotational position, blocking flow to both flow circuits. It is also contemplated that the outlet pattern defined in pintle 214 can be configured to allow flow through only one flow circuit at a time. Moreover, the second flow circuit can optionally be eliminated for applications where it is only desired to toggle a single flow circuit.

The outlet of valve housing 202 includes two separate, tandem outlets 206 and 207, which can be routed to separate injectors or separate stages in a single injector for example. The routing of the first and second flow circuits to separate fluid outlets 206 and 207 is exemplary only, and any suitable flow circuit routing can be used without departing from the spirit and scope of the invention. For example, if desired for favorable thermal management, for example, the two outlets can be concentric with a pilot outlet surrounding a main outlet. It is also contemplated that both flow circuits can be routed to a common, single outlet for simply staging the amount of flow supplied to an injector, for example.

Figure 17:
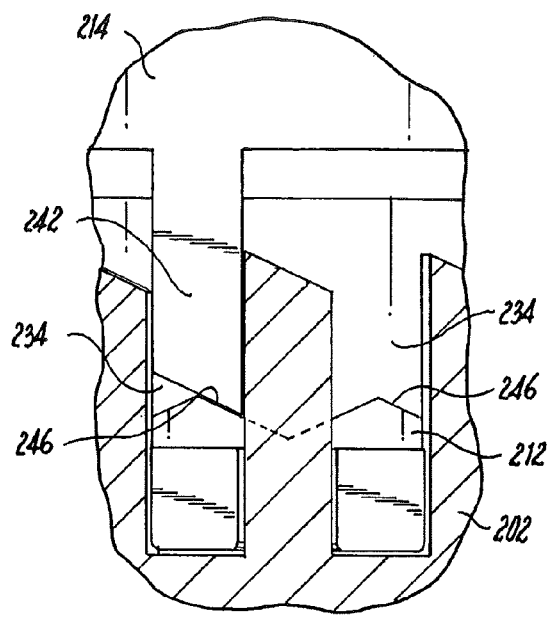
FIG. 17 is a is a schematic view of the toggle mechanism of the valve of FIG. 16, showing the finger of the pintle seated in a pocket of the valve housing.

Referring now to FIG. 17, which can be compared with FIG. 12 described above, since the rotational positions of pintle 214 are cycled, but the longitudinal positions of pintle 214 are the same for each of the different rotational positions, there is no need for every other pocket of valve housing 202 to be a shallow pocket and every other pocket to be a deep pocket. Instead, all of the pockets 234 are of the same depth so that pintle fingers 242 always rest against cam faces 246 of armature 212 in each rotational position.

The toggle mechanism of valve 100 can cycle flow between a valve closed, zero flow rate and a valve opened, full flow rate, and back. Those skilled in the art will readily appreciate that this is exemplary only, and that the cycle of flow can also include a partially opened, staged flow rates without departing from the spirit and scope of the invention. Similarly, with respect to valve 200, one or both of the flow circuits can include a partially opened, staged flow rate position without departing from the spirit and scope of the invention. It is also contemplated that any suitable number of linear positions can be provided for providing multiple flow rates. It is also possible to configure a toggle mechanism and valve to utilize cycling of linear and rotational positions in combination without departing from the spirit and scope of the invention.

It is contemplated that sensors can be included within valves such as valve 100 and valve 200 to verify full actuation. For example, one or more sensors can be included to determine the position, e.g., linear or rotational, of the toggle mechanism or pintle. In systems such as gas turbine engines, multiple valves such as valves 100 and 200 can be used in a manifold system to provide flexible control of a plurality of individual fuel injectors. Valving patterns on an injector by injector basis in such a system can be reconfigured without requiring any change to the hardware—only the control system need be changed. Moreover, in systems such as those having a plurality of fuel injectors, it is not necessary to provide simultaneous impulses to all of the valves at the same time. The peak electrical loads can be reduced significantly by actuating the valves in sequence so that only one or a few valves are hit with an impulse at a single time. Such sequencing can be done rapidly, and can be optimized such as for starting a gas turbine engine, light around, or lean blow out.

While shown and described above in the exemplary context of fuel injection for gas turbine engines, those skilled in the art will readily appreciate that any suitable fluid can be used in any suitable application without departing from the spirit and scope of the invention. For example, valves as described above can be used in any suitable application such as low pressure fluid systems that require a checking feature, or bypass lines where the valve acts as a slave apparatus to prime a fluid line with only a portion of the total flow during low pressure operations where a suitable pressure may not be available to maintain an open position of a checking feature. Other exemplary applications include chemical processing, steel mill cooling, spray tanning, lawn sprinklers, or any other suitable application where a valve must be opened or closed.

While exemplary embodiments having one or two flow circuits have been described above, those skilled in the art will readily appreciate that any suitable number of flow circuits can be included. Moreover, while described above with exemplary embodiments having two linear toggle positions, those skilled in the art will readily appreciate that any suitable number of linear positions can be achieved without departing from the spirit and scope of the invention, for example by having three or more different pocket depths in the toggle mechanism. While shown and described in the exemplary context of using magnetic impulses for toggling the flow, it is contemplated that any suitable method of providing impulses can be used. For example, hydraulics, piezo cells, electromechanical mechanisms, purely mechanical mechanisms, or any other suitable means can be used to provide the impulses. For example, a relatively small hydraulic impulse source can be used to provide the impulse to toggle the valve, which can itself be a control valve for a relatively large fluid circuit, as in an application for valving a relatively large hydraulic line. Another example is that a solenoid can be used to control a hydraulic valve used to provide impulses to toggle a valve such as valves 100 and 200 in lieu of using a solenoid to directly toggle the toggle mechanism.

The methods and systems of the present invention, as described above and shown in the drawings, provide for valves with superior properties including improved duty cycles. While the apparatus and methods of the subject invention have been shown and described with reference to preferred embodiments, those skilled in the art will readily appreciate that changes and/or modifications may be made thereto without departing from the spirit and scope of the subject invention.

What is claimed is:

1. A valve comprising:
   a valve housing including a fluid inlet and a fluid outlet with a longitudinal axis defined through the valve housing;
   an armature mounted within the valve housing for movement relative to the valve housing along the longitudinal axis;
   a pintle mounted within the valve housing with an interior flow passage defined in the pintle in fluid communication with the fluid inlet of the valve housing, and a pintle outlet for selective fluid communication between the interior flow passage of the pintle and the fluid outlet of the valve housing, wherein the pintle and armature are configured and adapted so that repeated impulse actuation of the armature along the longitudinal axis cycles the pintle between first and second rotational positions corresponding to first and second flow rates for fluid communication from the interior flow passage of the pintle to the fluid outlet of the valve housing; and
   first and second flow circuits defined in the fluid outlet of the valve housing for staging of flow between the first and second flow circuits, wherein in the first rotational position of the pintle, the interior flow passage of the pintle is in fluid communication with the first flow circuit, and wherein in the second rotational position of the pintle, the interior flow passage of the pintle is in fluid communication with the second flow circuit, wherein a portion of the first and second flow circuits is defined in the armature.

2. A valve as recited in claim 1, wherein in the first rotational position, fluid communication from the interior flow passage of the pintle to the fluid outlet of the valve housing is blocked for a zero flow rate, and wherein in the second rotational position, the interior flow passage of the pintle is in fluid communication with the fluid outlet of the valve housing.

3. A valve as recited in claim 1, wherein in the second rotational position of the pintle, the interior flow passage of the pintle is in fluid communication with both of the first and second flow circuits.

4. A valve as recited in claim 1, wherein the armature and pintle fit together with a liquid tight clearance for separation of the first and second flow circuits.

5. A valve comprising:
   a valve housing including a fluid inlet and a fluid outlet with a longitudinal axis defined through the valve housing;
   an armature mounted within the valve housing for movement relative to the valve housing along the longitudinal axis;
   a pintle mounted within the valve housing with an interior flow passage defined in the pintle in fluid communication with the fluid inlet of the valve housing, and a pintle outlet for selective fluid communication between the interior flow passage of the pintle and the fluid outlet of the valve housing, wherein the pintle and armature are configured and adapted so that repeated impulse actuation of the armature along the longitudinal axis cycles the pintle between first and second rotational positions corresponding to first and second flow rates for fluid communication from the interior flow passage of the pintle to the fluid outlet of the valve housing; and first and second flow circuits defined in the fluid outlet of the valve housing for staging of flow between the first and second flow circuits, wherein in the first rotational position of the pintle, the interior flow passage of the pintle is in fluid communication with the first flow circuit but not the second flow circuit, and wherein in the second rotational position of the pintle, the interior flow passage of the pintle is in fluid communication with both the first flow circuit and second flow circuit, wherein a portion of the first and second flow circuits is defined in the armature.

6. A valve as recited in claim 5, wherein in the first rotational position, fluid communication from the interior flow passage of the pintle to the fluid outlet of the valve housing is blocked for a zero flow rate, and wherein in the second rotational position, the interior flow passage of the pintle is in fluid communication with the fluid outlet of the valve housing.

7. A valve as recited in claim 5, wherein in the second rotational position of the pintle, the interior flow passage of the pintle is in fluid communication with both of the first and second flow circuits.

8. A valve as recited in claim 5, wherein a portion of the first and second flow circuits is defined in the armature.

9. A valve as recited in claim 5, wherein the armature and pintle fit together with a liquid tight clearance for separation of the first and second flow circuits.

* * * * *